United States Patent [19]

Matsuhisa

[11] Patent Number: 4,539,224

[45] Date of Patent: Sep. 3, 1985

[54] METHOD FOR REINFORCING A CERAMIC SHAPED BODY

[75] Inventor: Tadaaki Matsuhisa, Kasugai, Japan

[73] Assignee: NGK Insulators, Ltd., Japan

[21] Appl. No.: 507,592

[22] Filed: Jun. 24, 1983

[30] Foreign Application Priority Data

Aug. 28, 1982 [JP] Japan .................................. 57-149786

[51] Int. Cl.$^3$ .............................................. B05D 3/02
[52] U.S. Cl. ..................................... 427/190; 427/189;
427/191; 427/192; 427/193; 427/369;
427/376.2; 427/376.6; 427/376.7; 427/376.8
[58] Field of Search ............... 427/369, 189, 190, 191,
427/192, 193, 376.2, 376.6, 376.7, 376.8

[56] References Cited

U.S. PATENT DOCUMENTS

| | | | |
|---|---|---|---|
| 3,754,968 | 8/1973 | Reznick | 427/369 |
| 3,873,351 | 3/1975 | Ueda et al. | 427/369 |
| 3,874,899 | 4/1975 | Miszento et al. | 427/369 |
| 4,112,143 | 9/1978 | Adlerborn et al. | 427/369 |

*Primary Examiner*—Norman Morgenstern
*Assistant Examiner*—Janyce A. Bell
*Attorney, Agent, or Firm*—Parkhurst & Oliff

[57] ABSTRACT

A ceramic shaped body having an improved mechanical strength which is useful for a structural material, such as engine parts, is produced by coating a slip which is substantially the same in the chemical composition as the ceramic shaped body and is very small in the difference of the thermal expansion coefficient at 800° C. from the shaped body, on the surface of the shaped body, drying the coated shaped body, subjecting the thus treated shaped body to a hydrostatic press and firing such a shaped body.

5 Claims, No Drawings

METHOD FOR REINFORCING A CERAMIC SHAPED BODY

BACKGROUND OF THE INVENTION

1. Field of the Invention:

The present invention relates to a method for reinforcing a ceramic shaped body, particularly ceramics useful for structural materials.

2. Description of the Prior Art:

Silicon ceramics, such as silicon nitride, silicon carbide, SiAlON, etc., and zirconia ceramics or ceramics having a low thermal expansion, such as cordierite, etc. exhibit excellent heat resistance and the thermal shock resistance. Therefore, these ceramics have been utilized as structural materials, such as engine parts of gas turbine or internal combustion engines. But, these ceramics can be brittle if there are large defects in the surface or in an inner portion, whereby stress concentrates in or near these defects under normal operation and therefore, mechanical failure occurs therefrom thereby lowering the strength. Particularly, when ceramics are shaped by injection molding process, extrusion molding process and the like, the strength of the sintered bodies is liable to be noticeably lowered due to the unevenness of surfaces and, cavities or cracks formed on the surface of the shaped body.

In order to solve these problems, the following processes have been heretofore known. That is, a glaze is coated on the surface of the shaped body and the coated shaped body is fired to form a compressed layer on the surface of the sintered body; or the surface of the sintered body is coated with CVD process; or the sintered body is re-fired at a high temperature to round the crack tips. However, the process wherein the glaze is coated on the surface of the shaped body, has the defects that a glass layer having a low melting point which is different in the composition from the ceramic shaped body, is formed on the surface of the sintered body, so that such a shaped body cannot be used at a high temperature and further the difference of between the thermal expansion of the material of the shaped body and the glass layer is large and therefore when the coated body is exposed to the glass layer is readily separated from the shaped body. The CVD process is expensive and it is difficult to completely remove cracks and cracks still remain. Hence, the strength cannot be highly increased.

SUMMARY OF THE INVENTION

The present invention aims to obviate these defects and problems and more particularly relates to a method for reinforcing ceramics which are to be used as a structural material. The method comprises coating on a surface of a ceramic shaped body a slip which is substantially the same in its chemical composition as the shaped body and it has a thermal expansion efficient more than 0.1%, at 800° C., in from the thermal expansion coefficient of the shaped body after firing, drying the slip coated shaped body; subjecting said body to a hydrostatic press; and then firing said body.

That is, in the method for reinforcing ceramics in the present invention, fine cracks or uneven portions present on the surface of the ceramic shaped body are filled with a coating substance which is substantially the same in its chemical composition as the shaped body and has a very small difference in its thermal expansion. The thus treated shaped body is subjected to a hydrostatic press and then fired, whereby defects such as fine cracks and uneven portions are removed to improve the mechanical strength.

DESCRIPTION OF THE PREFERRED EMBODIMENTS

The present invention will be explained in more detail hereinafter. Silicon nitride, silicon carbide, SiAlON, zirconia, alumina, cordierite, magnesium aluminium titanate or substances capable of forming these compounds through a firing procedure, but preferably silicon ceramics, such as silicon nitride, silicon carbide or substances capable of forming these silicon ceramics through a firing procedure are shaped into a desired form. As a process for shaping the ceramics, use may be made of extrusion processes, press processes, slip casting processes, injection molding processes and the like, which have been generally used for shaping ceramics. If necessary, the shaped body is pre-fired or preferably the surface of the pre-fired body is abraded with an abrasive in the range of 50–500 μm to remove the surface layer. The pre-firing is conducted to provide strength so as to render the abrasion or the handling easy, at such a temperature that the shrinkage of the shaped body due to the pre-firing does not substantially occur. For example, the shrinkage being less than 1%. Then, on the surface of the ceramic shaped body consisting of the raw shaped body or the calcined shaped body a slip is coated which is substantially its same in the chemical composition as the shaped body and does not differ by more than 0.1%, at 800° C., from the thermal expansion coefficient of the shaped body, after firing. In this case, the slip may contain a molding aid, such as a binder, a deflocculant, a mixing medium, such as water or an organic solvent, etc. in addition to a substance capable of forming substantially the same chemical composition as the ceramic shaped body through firing. The process for coating the slip may be a spray process, a brushing process, or as immersing process, but the spray process is desirable because the thickness of the coated layer can be controlled and the coating can be of a uniform thickness. It is preferable to conduct the coating in such a manner that the thickness of the coated layer is between 10 μm–500 μm, preferably 50 μm–200 μm after firing. If the thickness of the coated layer after firing is less than 10 μm, it is impossible to satisfactorily fill the defects on the surface of the shaped body and therefore the strength cannot be increased. Conversely, if said thickness is greater than 500 μm, the effect of increasing the strength of the body during thermal cycling of the body.

After the slip is coated on the surface of the ceramic shaped body, the coated slip is dried to remove water or the organic solvent and the entire shaped body is covered with an elastic sheet, such as latex rubber, and is subjected to a hydrostatic pressing. The hydrostatic press occurs at a pressure which is higher than the pressure applied when the shaped body is formed, usually a pressure of 500–5,000 kg/cm$^2$, preferably 1,000–3,000 kg/cm$^2$. Thereafter, the elastic sheet is removed from the surface of the shaped body and if necessary, the shaped body is heated to remove the molding aid and the like. The thus treated shaped body is fired under the conditions conforming to the quality and composition of the ceramic.

When the substance which forms silicon nitride, silicon carbide, sialon and the like through firing, is used as a raw material for the shaped body, the firing atmosphere as well as the firing temperature are very important. The reason why the difference between the thermal expansion coefficient between the shaped body and the slip at 800° C. after firing is defined to be not more than 0.1% is as follows. When the difference exceeds 0.1%, the coated layer readily separates from the shaped body during thermal cycling of the body.

The following examples are given for the purpose of illustration of this invention and are not intended as limitations thereof.

EXAMPLE 1

77 parts by weight of $Si_3N_4$ powder having an average grain size of 0.5 $\mu$m, 2 parts by weight of SrO, 4 parts by weight of MgO and 2 parts by weight of $CeO_2$ as sintering aids, and 15 parts by weight of paraffin wax were mixed together to prepare a raw batch material of ceramics and by using such a raw batch material, three turbine rotors having a maximum diameter at the blade portion of 85 mm and a total length of 100 mm were manufactured by the injection molding process.

A powder of $Si_3N_4$, SrO, MgO and $CeO_2$ in the same composition as described above had added to it 3% by weight of methyl cellulose and 80% by weight of water to prepare a slip having substantially the same composition as the shaped body.

Three turbine rotors were gradually heated to 500° C. to remove the paraffin wax and then said turbine rotors were pre-fired at 1,100° C. for 30 minutes to give a certain degree of strength to the rotors and said rotors were subjected to a hydrostatic pressure of 1 t/cm$^2$.

The slip was coated on the surface of one pre-fired rotor (shaped body) of the three rotors so that the coated layer after firing had the thickness described in the following Table 1. The coated rotor was dried and covered with latex rubber and subjected to a hydrostatic pressure of 2.5 t/cm$^2$. The thus treated rotor was heated at 450° C. for one hour to remove the binder and fired at 1,700° C. for one hour under nitrogen to obtain a turbine rotor No. 1 shown in Table 1. With respect to another pre-fired rotor (shaped body), the surface was abraded in a thickness of 300 $\mu$m to remove the surface layer. Thereafter, the slip was coated on the thus treated rotor in the same manner as described above so that the layer after firing had the thickness as shown in Table 1. Then, the slip coated rotor was dried and covered with a latex rubber and subjected to a hydrostatic pressure of 2.5 t/cm$^2$ and fired the same conditions as described above to obtain a turbine rotor No. 2 described in Table 1.

For comparison, the pre-fired rotor which was not coated with the slip, was fired at 1,700° C. for one hour under nitrogen to prepare a comparative sample No. 3 shown in Table 1.

The thus obtained three turbine rotors No. 1-No. 3 were balanced to make the degree of unbalancing equal and then the spin test was carried out by means of a spin tester. The results are shown in Table 1.

TABLE 1

| | Sample No. | Slip layer | Thickness of the coated layer after firing | Rotation number at breakage (Rotation per minute) |
|---|---|---|---|---|
| Present invention | 1 | Provided | 200 $\mu$m | 120,000 |
| | 2 | Provided (coating after the surface layer is removed) | 80 $\mu$m | 138,000 |
| Comparative sample | 3 | Not provided | — | 52,000 |

As shown from the results of Table 1, the rotor No. 3, in which slip having the same composition as in the shaped body was not been coated on the surface, was broke at 52,000 revolutions per minute minute. While rotors No. 1 and No. 2 in which the slip having the same composition was coated on the surface by the method of the present invention, endured to RPM's of greater than 100,000, more than twice the RPM of the untreated sample. No. 3. Hence, a remarkable improvement of the strength occurred. The difference in the thermal expansion coefficient, at 800° C., between the slip which has been dried, subjected to a hydrostatic pressure of 2.5 t/cm$^2$ and then fired, and the fired turbine rotor not coated with the slip was 0.01%.

After the breakage, the turbine rotors No. 1 and No. 2 were cut and the surface portion was observed with a microscope. The portions coated with the slip were colored somewhat more black than the shaped body itself but were completely integrated with the shaped body.

EXAMPLE 2

77 parts by weight of SiC powder having a grain size of 1 $\mu$m, 1.5 parts by weight of boron, 2.3 parts by weight of carbon and 19.2 parts by weight of wax were mixed together to prepare a raw batch of ceramics and by using the raw batch material, two turbine blades having a length of 50 mm were manufactured by an injection molding process. These two turbine blades were heated at 500° C. for 20 hours to remove wax were then, covered with a latex bags and subjected to a hydrostatic pressure of 1.5 t/cm$^2$ to obtain shaped bodies.

A mixture of SiC powder, boron and carbon in the same composition as described above had added to it 0.5% by weight of sodium alginated and 50% by weight of ethyl alcohol to prepare a slip having substantially the same composition as the ceramic shaped body. The slip was brushed on the surfaces of two turbine blade-formed ceramic shaped bodies in a thickness of 400 $\mu$m and one of them was dried and fired at 2,200° C. for one hour in argon and another was dried and put in a latex bag and subjected to a hydrostatic pressure of 3.5 t/cm$^2$ and then fired at 2,200° C. in argon for one hour.

The turbine blade which was not subjected to the hydrostatic pressure after drying, exhibited a separating effect between the slip coated layer and the ceramic body, which the turbine blade according to the present invention which was subjected to the hydrostatic pressure of 3.5 t/cm$^2$, did not show any separating effects and the was strongly bonded to the shaped body and completely integrated with the shaped body. The difference between the thermal expansion coefficient, at 800° C., between of the slip coated on the shaped body, which has been subjected to the pressure of 3.5 t/cm$^2$ after drying, and then fired, and the shaped and fired turbine blade, was 0.02%.

As mentioned above, in the method for reinforcing ceramics according to the present invention, the slip which is substantially its same in the chemical composition as the ceramic shaped body and has a very small difference between its thermal expansion coefficient and the thermal expansion coefficient of the ceramic shaped body after firing, is coated on the surface of the ceramic shaped body, subjected to a hydrostatic pressure and then fired. Therefore, there is substantially no difference between the thermal expansion coefficient of the coated layer and the shaped body and the coated layer is integrally and strongly bonded to the shaped. Hence the coated layer is not separated from the shaped body even if subjected to thermal cycling. The slip fills the cracks and cavities present on the surface of the shaped body, so that the size and number of defects which can initiate catastrophic failure are noticeably decreased. Therefore, the mechanical strength of the ceramic shaped body can be remarkably improved and the present invention is very effective when the fired body is used for a fired face application and is useful as a method for reinforcing various ceramic parts, such as ceramic gas turbine engine parts, for example, vane, blade or axial turbine rotors, ceramic engine parts, for example, turbocharger rotors, pressure wave type supercharger rotor, etc., and is therefore very commercially valuable.

What is claimed is:

1. A method for reinforcing a ceramic body, comprising: applying a coating of a slip composition on a shaped ceramic body, said coating having substantially the same chemical composition as the ceramic body after firing thereof, said coating being applied by a coating process selected from the group of processes consisting of spraying the coating on the shaped ceramic body, brushing the coating on the shaped ceramic body and immersing the shaped ceramic body in the coating; drying the coated shaped body; then hydrostatically pressing the coated shaped body; and then firing the coated shaped body to obtain a fired ceramic body, whereby after firing the coefficient of thermal expansion at 800° C. of the coating differs from that of the fired ceramic body by not more than 0.1%.

2. The method as claimed in claim 1, wherein the ceramic body is a turbine rotor.

3. The method as claimed in claim 1, wherein the ceramic body is a turbine blade.

4. The method as claimed in claim 1, wherein the ceramics are selected from the group of materials consisting of silicon nitride, silicon carbide, SiAlON, zirconia, alumina, cordierite, magnesium aluminium titanate and substances capable of forming these compounds.

5. A method for reinforcing a ceramic body, comprising: coating a shaped ceramic body with a slip composition which after firing has substantially the same chemical composition as the ceramic body; drying the coated shaped body; then hydrostatically pressing the coated shaped body; and then firing the coated shaped body to obtain a fired ceramic body, whereby after firing the coefficient of thermal expansion at 800° C. of the coating differs from that of the fired ceramic body by not more than 0.1%.

* * * * *